(12) United States Patent
Liu et al.

(10) Patent No.: US 11,784,827 B2
(45) Date of Patent: Oct. 10, 2023

(54) IN-MEMORY SIGNING OF MESSAGES WITH A PERSONAL IDENTIFIER

(71) Applicant: Micron Technology, Inc., Boise, ID (US)

(72) Inventors: Zhan Liu, Cupertino, CA (US); Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 17/196,132

(22) Filed: Mar. 9, 2021

(65) Prior Publication Data

US 2022/0294644 A1 Sep. 15, 2022

(51) Int. Cl.
*H04L 29/06* (2006.01)
*H04L 9/32* (2006.01)
*H04L 9/08* (2006.01)
*H04L 9/30* (2006.01)

(52) U.S. Cl.
CPC .......... *H04L 9/3263* (2013.01); *H04L 9/0825* (2013.01); *H04L 9/3066* (2013.01); *H04L 9/3247* (2013.01); *H04L 9/3278* (2013.01)

(58) Field of Classification Search
CPC ... H04L 9/3263; H04L 9/0825; H04L 9/3066; H04L 9/3247; H04L 9/3278; H04L 9/083; H04L 9/14; H04L 9/0866; H04L 9/321; H04L 9/3271
See application file for complete search history.

(56) References Cited

U.S. PATENT DOCUMENTS

| | | | |
|---|---|---|---|
| 8,516,269 B1 * | 8/2013 | Hamlet | G06F 21/445 713/180 |
| 10,009,325 B1 * | 6/2018 | David | H04L 9/08 |
| 10,256,983 B1 * | 4/2019 | Bauer | H04L 9/0861 |
| 10,447,682 B1 * | 10/2019 | Du Lac | H04L 9/3247 |
| 10,459,845 B1 * | 10/2019 | Cariello | G06F 12/10 |
| 11,012,425 B2 * | 5/2021 | Mondello | H04L 9/3278 |
| 11,218,330 B2 * | 1/2022 | Mondello | H04L 63/0823 |

(Continued)

FOREIGN PATENT DOCUMENTS

| | | | | |
|---|---|---|---|---|
| CN | 101808092 A | * | 8/2010 | |
| CN | 105812142 A | * | 7/2016 | ........... H04L 9/0891 |

(Continued)

OTHER PUBLICATIONS

International Search Report and Written Opinion, PCT/US2022/018521, dated Jun. 9, 2022.

*Primary Examiner* — Sher A Khan
(74) *Attorney, Agent, or Firm* — Greenberg Traurig (57) ABSTRACT

The disclosed embodiments are related to the generation of a personal identifier within a memory device. In one embodiment, a method is disclosed comprising generating an asymmetric key pair from a physically unclonable function (PUF), the asymmetric key pair including a public key and a private key; generating a certificate signing request (CSR) for the public key, the CSR including a user identifier and a customer public key; requesting a digital certificate of the public key from a certificate authority (CA), the certificate authority storing a mapping between the customer public key and the user identifier; receiving a message from a host device; signing the message using the private key; and transmitting the signed message and the digital certificate to a computing device.

17 Claims, 6 Drawing Sheets

(56) References Cited

U.S. PATENT DOCUMENTS

| | | | |
|---|---|---|---|
| 2002/0181701 A1* | 12/2002 | Lee | H04L 9/3066 380/1 |
| 2011/0213966 A1* | 9/2011 | Fu | H04L 63/0807 726/10 |
| 2013/0086642 A1* | 4/2013 | Resch | H04L 9/321 726/4 |
| 2013/0141137 A1* | 6/2013 | Krutzik | H01L 25/0657 326/8 |
| 2013/0318354 A1* | 11/2013 | Entschew | H04L 9/3247 713/175 |
| 2014/0089670 A1* | 3/2014 | Maletsky | H04L 9/3226 713/176 |
| 2018/0083788 A1* | 3/2018 | Yano | H04L 9/3226 |
| 2018/0167812 A1* | 6/2018 | Nagarajamoorthy | H04B 17/318 |
| 2018/0278418 A1* | 9/2018 | Chang | H04L 9/0891 |
| 2018/0351753 A1* | 12/2018 | Gardner | H04L 9/3218 |
| 2019/0007219 A1* | 1/2019 | Ghosh | H04L 9/3252 |
| 2019/0097818 A1* | 3/2019 | Lu | H04L 9/3263 |
| 2019/0199525 A1* | 6/2019 | Mondello | H04L 9/3242 |
| 2019/0280858 A1* | 9/2019 | Cam | H04L 9/3278 |
| 2019/0305973 A1* | 10/2019 | Dewan | H04L 9/3247 |
| 2019/0312851 A1 | 10/2019 | Campagna et al. | |
| 2019/0334882 A1* | 10/2019 | Mondello | H04L 9/0869 |
| 2019/0342090 A1* | 11/2019 | Pisasale | H04L 9/0662 |
| 2020/0127856 A1 | 4/2020 | Wei | |
| 2020/0195446 A1* | 6/2020 | Lepoint | H04L 63/0435 |
| 2020/0313911 A1* | 10/2020 | Mondello | H04L 9/3268 |
| 2020/0351657 A1* | 11/2020 | Wentz | H04L 9/3268 |
| 2022/0070004 A1* | 3/2022 | Liu | G06F 3/0679 |

FOREIGN PATENT DOCUMENTS

| | | | | |
|---|---|---|---|---|
| CN | 109040067 | | 12/2018 | |
| CN | 110674511 A | * | 1/2020 | |
| FR | 2969875 A1 | * | 6/2012 | H04L 9/0866 |
| GB | 0942568 A2 | * | 9/1999 | |
| KR | 20070075179 A | * | 7/2007 | |
| TW | 200913627 A | * | 3/2009 | H04L 9/302 |
| WO | WO-2017192215 A1 | * | 11/2017 | G07C 9/00039 |
| WO | WO-2019036356 A1 | * | 2/2019 | G06F 21/44 |
| WO | WO-2020142371 A1 | * | 7/2020 | G06F 12/1408 |
| WO | WO-2020144758 A1 | * | 7/2020 | H04L 9/0822 |

* cited by examiner

IN-MEMORY SIGNING OF MESSAGES WITH A PERSONAL IDENTIFIER

TECHNICAL FIELD

At least some embodiments disclosed herein relate to authentication in general, and more particularly, but not limited to authentication of a communication endpoint having a secure memory device in a service network.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

In the illustrated embodiment, a memory device stores a plurality of cryptographic keys. A first set of asymmetric keys are generated using a physically unclonable function (PUF) and thus can be used to uniquely identify the memory device. Since such keys are generated using a PUF, the keys are not required to be persisted to a non-volatile storage location and can be regenerated as needed. Thus, this first set of keys is uniquely tied to a given memory device.

In addition to these keys, a memory device stores a public key value that can be used by the memory device to validate commands received over a bus. This public key can thus be used to ensure that only authorized parties issue commands to the device, thereby hardening the device from unauthorized access. In one embodiment, this public key is first written by a manufacturer and the corresponding private key is safeguarded by the manufacturer and associated with memory device. A customer can then request to replace this public key by requesting a signed command from the manufacturer that replaces the public key on the device. In this manner, the manufacturer or a trusted third party can act as a key management system (KMS) and, in some embodiments, a certificate authority, that centrally manages ownership of each memory device.

By utilizing these two mechanisms, a memory device can maintain a secure identifier (via PUF-based keys) and can utilize the KMS infrastructure to ensure that only valid users can issue commands to the memory device. As a result, the private asymmetric key stored in the memory device can operate as a secure identity of the owner.

During operations, the memory device can expose an application programming interface that enables a host device to sign commands using the private key. Since the commands issued to the API must be signed with a private key corresponding to the customer's public key on the device, only the customer (i.e., user) can request a signature. This first level of security ensures that only valid users can request a signature. If a valid user requests a signature, the memory device can generate a signature using the ephemeral private key which is uniquely tied to the memory device. This second level of security ensures that private keys are only generated when needed and only after a user (e.g., customer) is authenticated.

Figure 1:
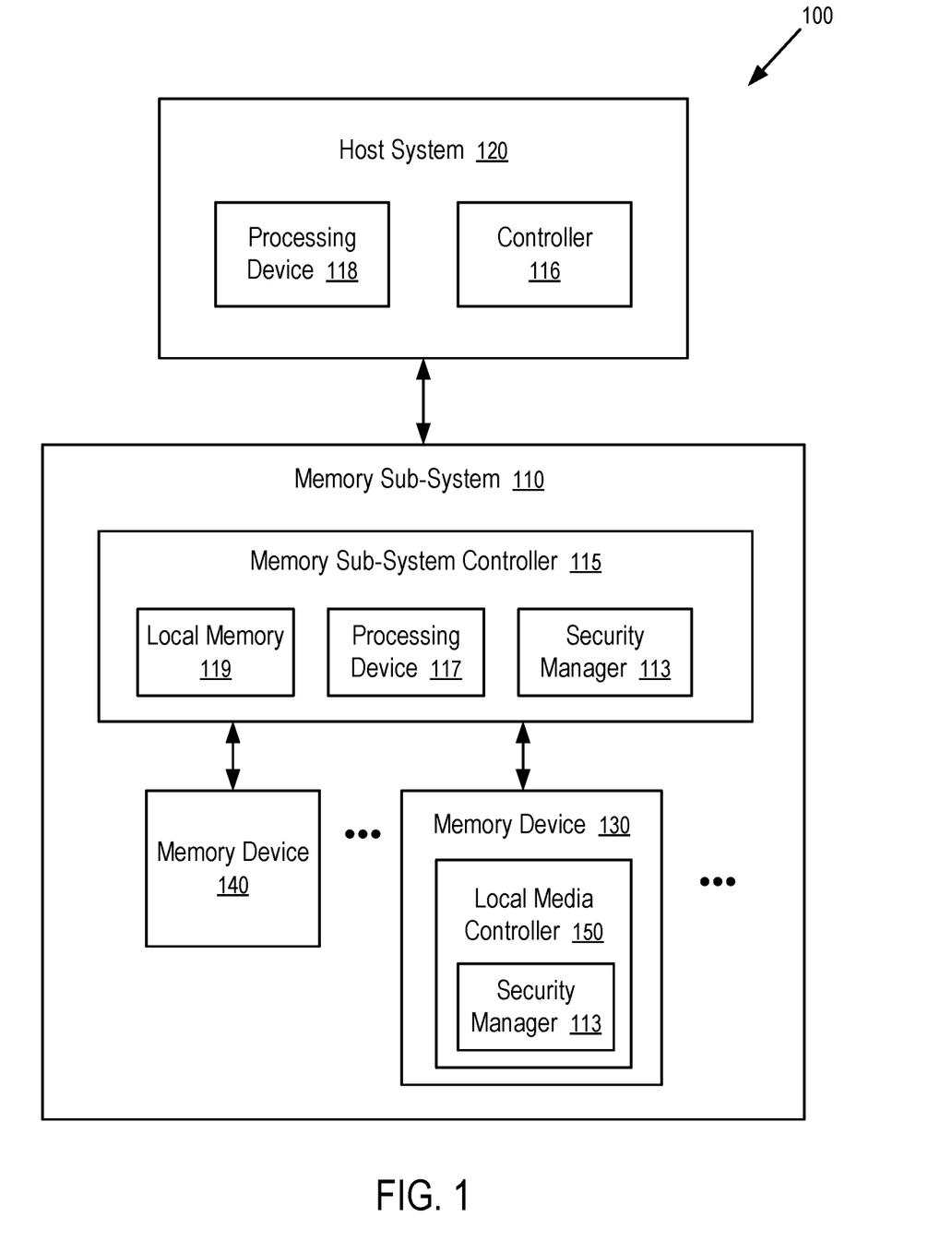
FIG. 1 illustrates an example computing system having a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 configured to generate a certificate that can be used to authenticate that the computing system 100, as an endpoint in a computer network, has a particular combination of the memory device 130 with one or more other components. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip included in the memory sub-system 110. In other embodiments, the security manager 113 can be part of firmware of the memory sub-system 110, an operating system of the host system 120, a device driver, or an application, or any combination therein.

For example, the security manager 113 can determine a cryptographic hash value of a set of instructions to be executed during boot time of the computing system 100. The security manager 113 can check the integrity of the set of instructions by comparing the hash value computed at the boot time with a pre-calculated hash value. If the hash values agree with each other, the set of instructions can be considered to have not been tampered with and/or corrupted. Thus, the set of instructions can be executed in the computing system 100 to further implement the security operations of the security manager 113 and/or the boot operations of the computing system 100. Optionally, the verification of the hash value can be part of the authentication of the computing system 100 as an endpoint using a certificate generated through the execution of at least a portion of the set of instructions during the boot time of the computing system 100.

For example, an identifier of the memory device 130 can be generated based at least in part on the hash value of the set of instructions. Thus, when the identifier of the memory device 130 is authenticated through the verification of the certificate, the hash value of the set of instructions can be considered to have been verified as correct; and the set of instructions used to generate the certificate and to boot up the computing system 100 has not been tampered with and/or corrupted.

The execution of the set of instructions in the computing system 100 causes the computing system 100 to determine the identifies of other components of the computing system 100, such as an identifier of the processing device 118, an identifier of the controller 116, an identifier of the memory sub-system controller 115, an identifier of the memory device 140, and/or an identifier of a software program (e.g., an operating system, a device driver, an application program, etc.). The set of identifiers of the components in the computing system 100 having the memory device 130, including the identifier of the memory device 130, can be combined to generate a cryptographic key for the signing of a certificate. The certificate may include a monotonically increasing counter value that increases every time the computing system 100 is booted up and/or every time the memory device 130 performs a secure operation.

The certificate can be communicated with a remote computer over a computer network for authentication. In some embodiments, the host device can further confirm the identity of the memory device via a challenge-response protocol. In these embodiments, the host device generates and issues a challenge to the memory device (e.g., a random or pseudo-random value). The memory device signs the challenge with its private key and returns the signed value. The host device can then confirm the signature using the correspond public key of the memory device. If the signatures match, the host device can confirm the memory device's identity. When the certificate is authenticated and the memory device's identify is confirmed, it can be concluded that the integrity of the set of instructions used to generate the certificate is intact, and the computing system 100 has the memory device 130 in combination with the set of components represented by the identifiers used to generate the cryptographic key that is used to sign the certificate. Additionally, the monotonic counter value included in the certificate allows its recipient to verify that it was generated recently, and thus that it can be trusted.

Figure 2:
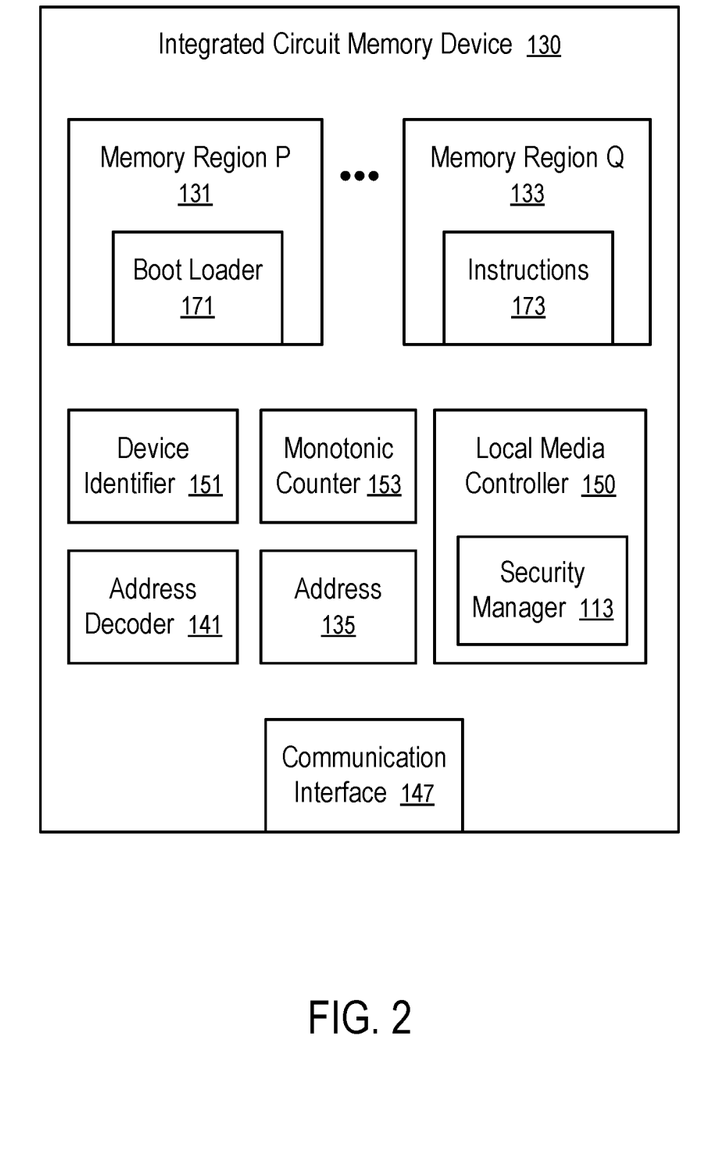
FIG. 2 illustrates an integrated circuit memory device having a security manager according to one embodiment.

FIG. 2 illustrates an integrated circuit memory device having a security manager according to one embodiment. For example, the memory devices 130 in the memory sub-system 110 of FIG. 1 can be implemented using the integrated circuit memory device 130 of FIG. 2.

The integrated circuit memory device 130 can be enclosed in a single integrated circuit package. The integrated circuit memory device 130 includes multiple memory regions 131, . . . , 133 that can be formed in one or more integrated circuit dies. A typical memory cell in a memory region 131, . . . , 133 can be programmed to store one or more bits of data.

The local media controller 150 can include at least a portion of a security manager 113 that is configured to control access to at least one of the memory regions 131, . . . , 133.

For example, the security manager 113 can control access to a memory region 131 based on a cryptographic key that is generated based on a secret of the integrated circuit memory device 130 and/or a cryptographic key representative of an owner or an authorized user of the memory device 130. When a request to write data into the memory region 131 is received in the integrated circuit memory device 130, the security manager 113 can verify whether the request can be permitted based on whether the requester is in possession of the cryptographic key. For example, the requester may digitally sign the request, or a challenge message, using the cryptographic key to indicate that requester has the permission to write data into the memory region 131.

The integrated circuit memory device 130 has a communication interface 147 to receive a command having an address 135 from the controller 115 of a memory sub-system 110. In response to the address 135 identifying a memory region 131 that requires access control, the security manager 113 performs cryptographic operations to verify that the request is from a requester having the cryptographic key authorized for the access to the memory region 131, before providing memory data retrieved from the memory region 131 using an address decoder 141. The address decoder 141 of the integrated circuit memory device 130 converts the address 135 into control signals to select a group of memory cells in the integrated circuit memory device 130; and a local media controller 150 of the integrated circuit memory device 130 performs operations to determine the memory data stored in the memory cells at the address 135.

For example, the memory region 131 can store a boot loader 171. At boot time, the security manager 113 can measure the boot loader 171 by computing a cryptographic hash value of the boot loader 171. The cryptographic hash value of the boot loader 171 can be used to generate a device identifier 151 of the integrated circuit memory device 130. The boot loader 171 (and/or an operating system or a device driver, or a security application) can include instructions to implement a portion of the security manager 113. During the boot time, the instructions can determine the configuration of the computing system 100 in which the integrated circuit memory device 130 is a component.

For example, the configuration of the computing system 100 of FIG. 1 can include the major software/firmware components of the memory sub-system 110. The software/firmware can be stored in other memory devices (e.g., 140), or in the memory device 130 in a memory region 133. For example, the instructions 173 in the memory region 133 in the integrated circuit memory device 130 can include the operating system of the computing system 100, device drivers, firmware, and/or software applications. Some of the major software/firmware components of the memory sub-system 110 can be stored outside of the memory region(s) under the access control of the security manager 113 and/or outside of the integrated circuit memory device 130. The identifiers of the software/firmware components can include component identifications, version numbers, serial numbers, and/or cryptographic hash values of the software/firmware components.

The configuration of the computing system 100 of FIG. 1 can include the major hardware components of the memory sub-system 110, such as the processing device 118 and/or the controller 116. The host system 120 can further include peripheral devices, such as a network interface card, a communication device, another memory sub-system, etc. The identifiers of the hardware components can include serial numbers, addresses, identification numbers, etc.

The configuration information of the computing system 100, including the device identifier 151 can be used to generate a cryptographic key to sign a certificate generated using at least the value from a monotonic counter 153. The security manager 113 is configured to increase the monotonic counter 153 for each use of the boot loader 171 to start the computing system 100 in which the memory device 130 is configured.

Figure 3:
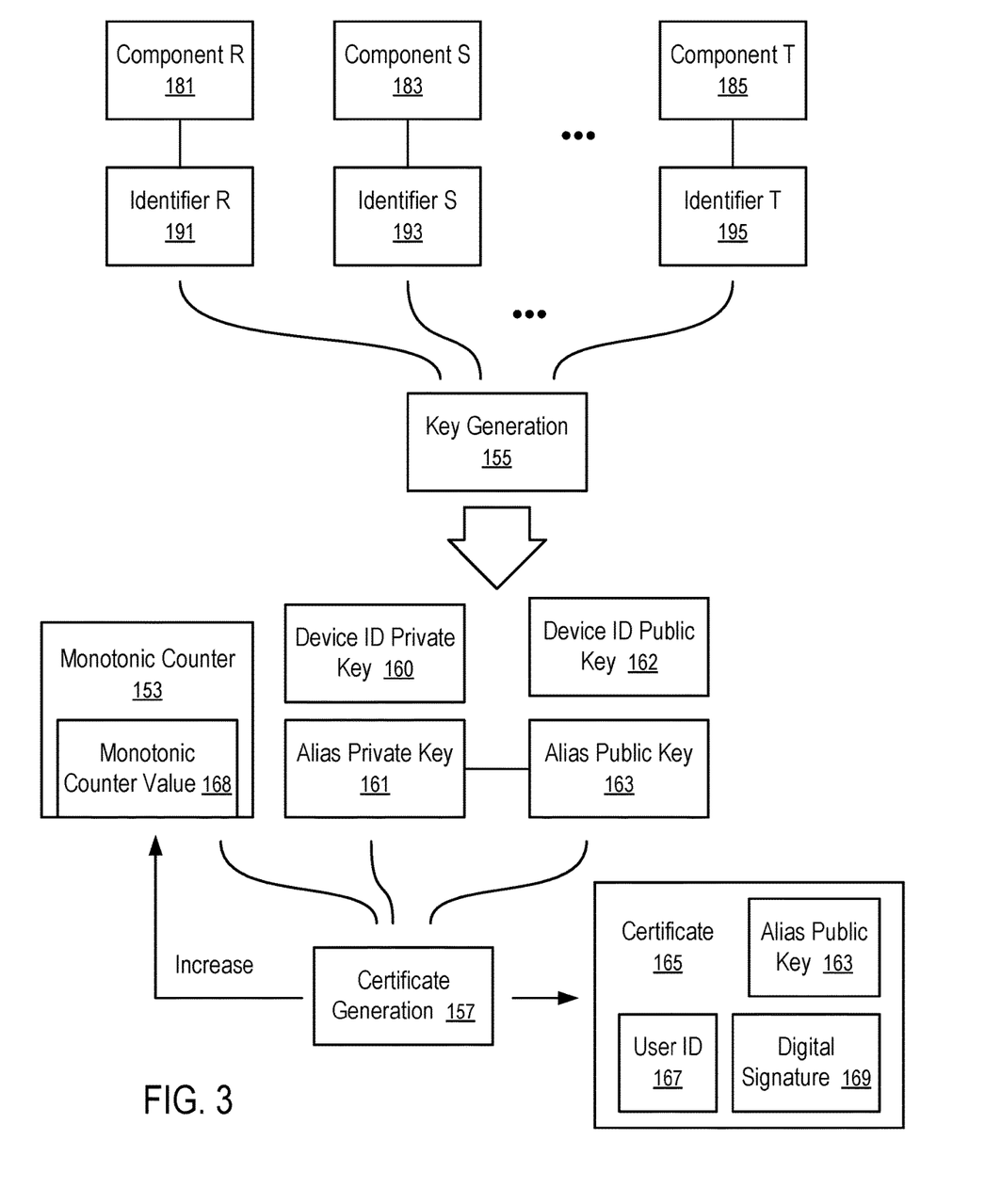
FIG. 3 illustrates the generation of a certificate for endpoint authentication according to one embodiment.

FIG. 3 illustrates the generation of a certificate for endpoint authentication according to one embodiment. For example, the security manager 113 illustrated in FIGS. 1 and/or 2 can generate a certificate using the technique of FIG. 3 at boot time of a computing system 100.

In FIG. 3, a computing system 100 has a set of components 181, 183, . . . , 185. The components 181, 183, . . . , 185 can include software components and/or hardware components. The components 181 to 185 can have corresponding identifiers 191, 193, . . . , 195. For example, a component S 183 can be a software component having an identifier S 193; and a component T 185 can be a hardware component having a separate identifier T 195.

An identifier of a component identifies at least some unique aspects of the component. In some instances, an identifier can uniquely identify a component among similar components having the same or similar functions. For example, an identifier of a software component can include or be based on a cryptographic hash value of the software component and/or a serial number of the software component. For example, an identifier of a hardware component can be based on a type, a description, a serial number, and/or an address of the hardware component.

An operation of key generation 155 is performed to obtain a first pair of a device ID private key 160 and a device ID public key 162 and a second pair of an alias private key 161 and an alias public key 163. In one embodiment, a physical unclonable function (PUF) may be used to generate a symmetric key on the device. This PUF may comprise an SRAM PUF, Delay PUF, or any other PUF technology implemented on the device. A PUF generally generates a digital fingerprint given a set of physical characteristics of a semiconductor device. Thus, the digital fingerprint is uniquely associated with each circuit used to generate the PUF. When implemented in a memory device, the PUF generates a unique identifier for the memory device based on the presence of the circuit in the memory device. Using this symmetric key, the device can generate a symmetric key using a symmetric key algorithm. In one embodiment, a symmetric key algorithm takes the digital fingerprint as an input and outputs the symmetric key. Since the PUF is tied to the circuitry generating the value, the PUF can be regenerated at any moment and need not be stored in volatile memory. It thus follows that the symmetric key can be regenerated consistently at any time and is not required to be stored.

The symmetric key can then be used to generate an asymmetric key pair. Similar to symmetric key generation, an asymmetric key is generated using a large random number as an input. In the illustrated embodiment, the symmetric key is used as this input and thus is used to generate the asymmetric key pairs. Since the digital fingerprint and symmetric key can be generated consistently and repeatedly at will, it thus follows that the asymmetric key pair can be generated in the same manner. Using asymmetric cryptography, cipher text generated using the alias private key 161 can be decrypted using the alias public key 163; and cipher text generated using the alias public key 163 can be decrypted using the alias private key 161. Since it is very difficult to determine the alias private key 161 from the alias public key 163, revealing the alias public key 163 would not compromise the secrecy of the alias private key 161.

An operation of certificate generation 157 is performed to generate a certificate 165 that contains a digital signature 169 signed using the device ID private key 160. The certificate 165 contains data to be signed, including the alias public key 163 and the current monotonic counter value 168. A side-effect of the certificate generation 157 is increasing the value 168 of the monotonic counter 153.

Optionally, the certificate 165 can include a user ID 167, such as a name, an email address, a registered user name, or another identifier of an owner or authorized user of the computing system 100 in which the certificate 165 is created.

Optionally, the certificate 165 can include some of the identifiers 191 to 195 and/or the value of the monotonic counter 153.

Optionally, some of the information provided via the certificate can be in an encrypted form. For example, the information can be encrypted using a public key of a server that is authorized to access the encrypted information, such as a server that is configured to authenticate the digital signature 169.

The security manager 113 is configured to generate a certificate 165 during each instance of booting up the computing system 100 using the boot loader 171 secured in the memory device 130. A certificate 165 generated based on a higher value of the monotonic counter 153 invalidates the certificates generated user lower values of the monotonic counter 153. The remote host will refuse any certificate with lower monotonic counter value than the one used for the last successful connection.

Preferably, after the certificate 165 is generated, the device ID private key 160 is purged from the computing system 100 and the memory device 130. A set of instructions protected by the security manager 113 can be executed to use the certificate 165 generated at the boot time to authenticate the computing system 100 as an endpoint in a computer network. A remote server having the device ID public key 162 can verify that digital signature 169 and the configuration of the computing system 100 as identified by the identifiers 191 to 195 used in the key generation 155.

Figure 4:
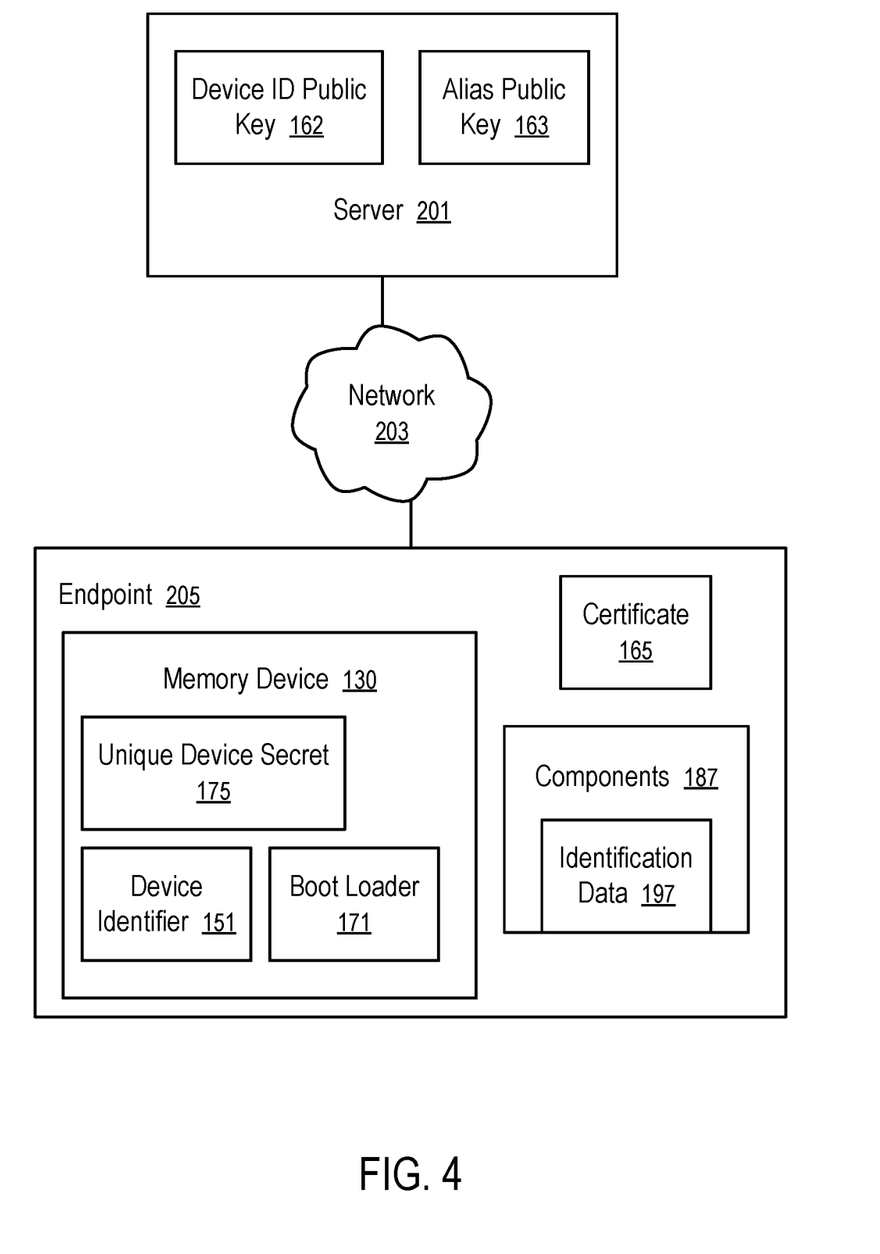
FIG. 4 illustrates the use of a certificate for endpoint authentication according to one embodiment.

FIG. 4 illustrates the use of a certificate for endpoint authentication according to one embodiment. For example, an endpoint 205 in FIG. 4 can be a computing system 100 of FIG. 1 having a security manager 113 configured in the integrated circuit memory device 130 of FIG. 2. The authentication can be performed using a certificate 165 generated using the technique of FIG. 3.

In FIG. 4, the endpoint 205 includes a memory device 130 that has a unique device secret 175. A device identifier 151 of the memory device 130 can be generated using a unique device secret 175 and a cryptographic measure of the boot loader 171. For example, the cryptographic measure of the boot loader 171 can be obtained by reading the boot loader 171 prior to its execution and applying a cryptographic hash function to the boot loader 171 to obtain a cryptographic hash value of the boot loader 171 that is to be executed.

The endpoint 205 has additional components 187 that have identification data 197. The combination of the device identifier 151 and the identification data 197 can be used to generate a certificate 165 in a way as illustrated in FIG. 3.

A server 201 connected to the endpoint 205 via a computer network 203 is provisioned to contain the device ID public key 162 corresponding to the device ID private key 160 used to sign the certificate 165. The server 201 can determine whether the certificate 165 is valid by decrypting the digital signature 169 using the device ID public key 162.

For example, when the memory device 130 is initially used in the endpoint 205 to boot up the endpoint 205, the endpoint 205 can register its identity with the server 201 by providing the device ID public key 162. The registration operation can include the storing of the device ID public key 162 to indicate that an endpoint 205, having a certificate verifiable via the device ID public key 162, is an authorized user. The device ID public key 162 can be associated with an identification of an owner and/or an authorized user of the endpoint 205.

The certificate 165 includes the value 168 of the monotonic counter 153 at the time of booting up the endpoint 205.

Optionally, the certificate 165 can include some of the identifiers 191 to 195 used to generate the alias private key 161, the alias public key 163, the device ID private key 160, and the device ID public key 162.

In some embodiments, the server 201 has a copy of the unique device secret 175. For example, the memory device 130 can be registered in a manufacturing facility of memory device 130 such that the device identifier 151 can be regenerated independently in a secure server (e.g., 201). When the server 201 receives the additional identifiers (e.g., 193 to 195, such as the identification data 197) from the endpoint 205, the secure server (e.g., 201) can independently compute the public key 163 for the authentication of the digital signature 169. Optionally, the certificate 165 can include the additional identifiers (e.g., 193 to 195, such as the identification data 197). Thus, when some of the components 187 have been replaced, the server 201 can determine whether to accept the change to the endpoint 205 or to require further verification that the endpoint 205 is legitimated and/or associated with a known owner or an authorized user.

For example, a set of instructions secured via the memory device 130 can be executed in the endpoint 205 to communicate the certificate 165 from the endpoint 205 to the server 201 for authentication. The certificate 165 of the endpoint 205 is generated at the time of booting up the endpoint 205 to represent the configuration of the endpoint 205 via the set of identifiers 191 to 195. After verifying that the certificate 165 is generated using the device ID private key 160 that represents the identifiers 191 to 195, the server 201 can determine whether the endpoint 205 having the configuration is permitted to operate and/or receiver services. In some instances, the server 201 can allow the endpoint 205 to replace certain components and/or have a replacement frequency below a threshold to pass authentication. Based on the response, the endpoint 205 can prompt the user to register, to demonstrate ownership or authorization to use, or to shut down.

Optionally, the server 201 can track the highest value of the monotonic counter 153 of the endpoint 205 as seen in the certificates from the endpoint 205 and/or the memory device 130. A certificate generated based on a counter value equal to or lower than the latest counter value used in a successful connection of one endpoint 205 to the server 201 can be described as obsolete. Endpoints 205 presenting an obsolete certificate will not be granted access to servers 201.

In some embodiments, the server 201 has a copy of the alias public key 163. When establishing a connection with the endpoint 205, and after verifying the certificate 165 has a valid digital signature 169 and a not-obsolete monotonic counter value 168, the server 201 may verify the alias public key 163 portion of the certificate. If the alias public key 163 stored in the server 201 and the alias public key 163 included in the certificate 165 do not match, then a connection with the endpoint 205 may not be allowed. This check can be used to prevent attacks where the malicious actor is able to steal the alias private key 161 from a valid device and use it on a device with a compromised identifier (e.g., one of device identifiers 151, 191, 193, . . . , 195). If the keys match, then the alias private key 161 available at runtime on the endpoint 205 may be used to sign content that may be verified by the server 201.

For example, as part of a connection establishment procedure, the server 201 may issue a challenge to the endpoint 205, which signs the response with the alias private key 161 and sends it back to the server 201. The server 201 may then use its copy of the alias public key 163 and verify that the challenge was signed by a valid endpoint 205.

Figure 5:
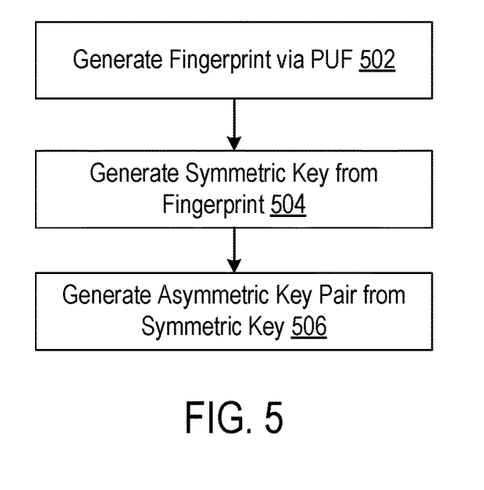
FIG. 5 is a flow diagram illustrating the generation of an asymmetric key pair according to some embodiments of the disclosure.

FIG. 5 is a flow diagram illustrating the generation of an asymmetric key pair according to some embodiments of the disclosure. In the illustrated embodiment, the method of FIG. 5 can be executed at any time, including at boot time.

In block 502, the method generates a digital fingerprint via a PUF. In one embodiment, the method uses a physical circuit to generate a value that is uniquely tied to a device implementing the method. In one embodiment, the method uses an SRAM PUF installed in a memory device to generate the digital fingerprint. In one embodiment, the SRAM PUF generates a unique value that is associated with the memory device including the SRAM PUF. Other types of PUFs may be used. In the illustrated embodiment, the value generated by the PUF comprises a suitably long "random" value generated by sub-micron variations in the PUF circuitry. The specific length of the PUF may be determined based on the downstream cryptographic processes, as will be discussed.

In block 504, the method generates a symmetric key using the digital fingerprint. As discussed, the digital fingerprint comprises a fixed length random value. Thus, the digital fingerprint can be used as the input to a symmetric key generation algorithm. In one embodiment, the symmetric key algorithm may be chosen based on the length of the digital signature. As an example, AES, 3DES, RC4, or similar symmetric key algorithms may be used to generate the symmetric key. In other embodiments, a SHA-256 algorithm may be used to generate the symmetric key. In this embodiment, while SHA-256 comprises a hashing algorithm, it can be used to generate an irreversible and repeatable value based on the digital signature. Thus, the SHA-256 algorithm operates to obfuscate the digital signature and acts as an intermediary step before generating a public-private key pair.

In block 506, the method generates a public-private key pair using the symmetric key as an input. As an example, the method may apply a SHA-256 algorithm to the digital fingerprint and obtain a 256-bit value. This 256-bit value can then be used as an elliptic curve (EC) private key to generate an x coordinate of an elliptic curve, the elliptic curved used in a downstream signature algorithm, such as an Elliptic Curve Digital Signature Algorithm (ECDSA). As will be discussed, the private key generated in block 506 may be kept private and stored locally on the device generating the pair. However, the public key portion may be shared with other devices by, for example, a Diffie-Hellman key exchange.

Figure 6:
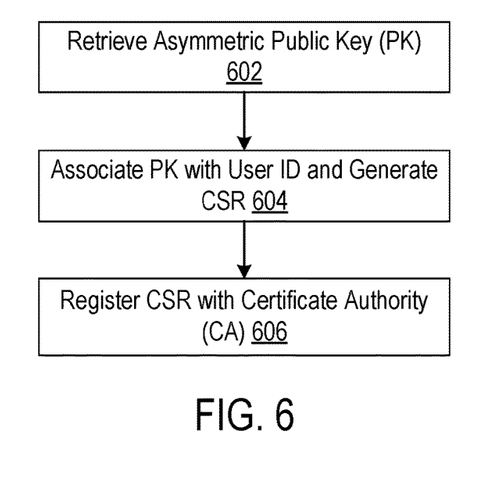
FIG. 6 is a flow diagram illustrate a key registration protocol according to some embodiments of the disclosure.

FIG. 6 is a flow diagram illustrate a key registration protocol according to some embodiments of the disclosure.

In block 602, the method retrieves the asymmetric public key from a memory device.

In one embodiment, the memory device is initially supplied with a manufacturer's public key. In one embodiment, during the manufacturing of the memory device, the manufacturer may generate an asymmetric key pair (e.g., an EC key pair) and write the public key (MFGSRK) to the memory device in a secure and non-volatile location. The manufacturer may then store the corresponding private key in a hardware security module (HSM). The manufacturer may also write a unique identifier (UID) to the device and associate the private key with the UID. After manufacturing, the device will utilize the value of MFGSRK to verify all commands issued to the memory device. Since this will require all commands to be signed with the private key associated with MFGSRK, the device will only respond to commands signed by the manufacturer after the device is released from manufacturing. Thus, in some embodiments, a customer (i.e., a purchaser of the device) may change the value of MFGSRK. To accomplish this, the customer may submit a replacement public key (SHSRK) to a key management server (e.g., operated by the manufacturer or a trusted partner). This replacement public key may be generated using an asymmetric key algorithm such as EC as well. Thus, the customer maintains the corresponding private key in a secure location (e.g., an HSM). The KMS validates the request and generates a signed command to replace the MFGSRK with SHSRK. This command is signed with the manufacturer's private key for the device and thus is a valid command from the perspective of the memory device. The customer receives the signed command and issues it to the memory device. The memory device will then validate the signed command and replace the value of MFGSRK with SHSRK. Thus, in this process, the customer "takes ownership" of the memory device by assigning its SHSRK to the memory device. Further, since the KMS confirms the validity of the request to change the key, the KMS can confirm ownership of the device. As will be discussed, the KMS may also act as a certificate authority (CA).

In one embodiment, the method is executed by a memory device and in block 602, the memory device receives a request to generate a certificate signing request (CSR) from a host device. In one embodiment, the memory device accesses the asymmetric public key in response to this request. As discussed above, this request may be signed with the private key corresponding to SHSRK and thus validated by the memory device prior to proceeding.

In an alternative embodiment, a host device issues a request to the memory device to retrieve its asymmetric public key (e.g., the one generated in FIG. 5). In the illustrated embodiment, the host device signs the request with the customer's private key and thus the memory device can validate the command using the value of SHSRK stored in the device. In response, the memory device may return the public key of the device.

In block 604, the method associates the public key with a user identifier and generates a certificate signing request (CSR).

In one embodiment, a user identifier comprises any value that can be used to identify a user of a memory device. For example, if the memory device is installed with a mobile device, the user identifier may comprise a phone number, email address, account name/code, or any other value uniquely tied to a user.

In the illustrated embodiment, the host device or memory device may generate a CSR using the public key of the memory device and the user identifier. In some embodiments, the CSR is generated according to a Public Key Cryptography Standards (PKCS) #10 standard, although other standards may be implemented. The private key is used to sign the CSR, which includes the public key and the user identifier. As discussed above, in some embodiments, the host device issues a command to the memory device which causes the memory device to generate the CSR and sign the contents of the CSR. In this scenario, the host device does not have access to the private key and thus relies on the memory device to sign the contents of the CSR. In alternative embodiments, the host device may instead have access to the private key. In this alternative, the host device can issue a command to the memory device which causes the memory device to return the public key and then the host device may generate the CSR, including signing the contents of the CSR with the private key stored by the host device.

In some embodiments, the CSR may include additional information regarding the user, host device, or memory device, as desired by the operator of the system. Notably, the CSR may include the UID value of the memory device. In one embodiment, the memory device generates and includes a digital signature in the CSR, the digital signature generated using its locally stored private key. In this embodiment, the memory device returns the signed CSR in response to a request for a CSR issued by a host device.

In another embodiment, the host device may generate an unsigned CSR and transmit the CSR to the memory device for signature. In response, the memory device may sign the CSR using the asymmetric private key corresponding to the asymmetric public key included in the CSR. The memory device may then return the signed CSR to the host device. In this manner, the CSR is uniquely associated with the user identifier and the memory device.

In block 606, the method registers the CSR with a CA.

In some embodiments, the CA may comprise the KMS used to manage the public key of the customer as described in FIG. 5. In this embodiment, the KMS already stores the asymmetric public key that is included in the CSR. Additionally, the KMS has associated that key with the memory device and stores the UID of the memory device. Thus, in block 606, the CA may automatically confirm the identity of the host device issuing the CSR.

Specifically, upon receiving the CSR, the CA will verify the message using the asymmetric public key in the CSR. The CA will then extract a UID from the CSR and identify the corresponding public key associated with the UID and managed by the CA. If the public key managed by the CA matches the public key in the CSR, the CA can immediately confirm that the CSR was submitted by an authorized party.

After the CA confirms the submitting device's identity, the CA generates a public key certificate that certifies the asymmetric public key. In one embodiment, this public key certificate comprises an X.509 certificate. In this embodiment, the CA signs the X.509 certificate with its own private key. The CA will then return the signed certificate to the host device. The host device may then use the certificate to prove its identity during future operations (described in connection with FIG. 7). In some embodiments, the host device may further write the signed certificate to the memory device by issuing a certificate write request and issuing the certificate write request to the memory device. In one embodiment, the host device signs the certificate write request with its private key as described previously to verify the command. The memory device may then receive the signed certificate and store the signed certificate for future use.

Figure 7:
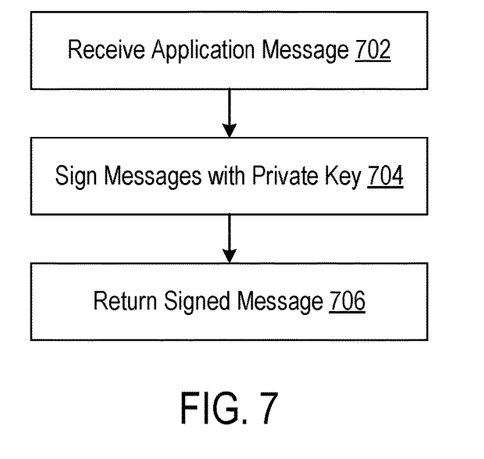
FIG. 7 is a flow diagram illustrating a method for signing a message according to some embodiments of the disclosure.

FIG. 7 is a flow diagram illustrating a method for signing a message according to some embodiments of the disclosure.

In block 702, a memory device receives an application message. In the illustrated embodiment, the application message may comprise any message issued by a host device. In one embodiment, the application message may comprise an email message, a payment request, a login request, or any other type of message. In the illustrated embodiment, the host device may sign the message using a private key. In response, the memory device may verify the message using a public key (i.e., SHSRK). Thus, only an authorized host device may issue the message to the memory device. As described previously, this host device comprises a device associated with a user identifier and thus the communications between host device and memory device are guaranteed to be between a user and the memory device.

In block 704, the memory device signs the message using an asymmetric private key stored on the memory device. As discussed in connection with FIG. 5, this private key may be generated at will and not stored. In the illustrated embodiment, the private key is generated using a PUF that supplies the input value. Since the PUF is repeatable, in some embodiments, the private key is generated as needed and never stored to nonvolatile storage, thus ensuring the privacy of the private key. Notably, the private key used in block 704 comprises a different private key used to sign the message received in block 702. Details of the generation of the private key used in block 704 (e.g., via a PUF) have been described above are not repeated herein.

In block 706, the memory device returns the signed message to the host device. In some embodiments, the memory device may only return the signature to the host device, reducing bandwidth between the device. In this embodiment, the host device retains a copy of the message and thus the memory device is not required to return a copy of the message, only the signature generated using the in-memory key. In this manner, the host device can utilize the signature generated by the memory device without storing the private key. By allowing the memory device to sign the message with its own, secret private key, the method can ensure that leakage of the private cannot is prevented. Further, since a repeateable PUF is used to generate the private keys, persistent storage of the private key is avoided which prevents, as one example, attacks on the memory device while powered off or otherwise not in use. In other embodiments, the memory device may return both the message and the signature. In some embodiments, the message may be returned to the host for convenience. Alternatively, in some embodiments, the host device may not store the message to improve security (i.e., to prevent exposure of the message while awaiting signature). Since the signature is generated using the private key of the memory device, the signature guarantees that the memory device validated the message via the signature.

After the host device receives the signature, the host device may issue the message to a third-party. In one embodiment, the host device issues the message along with the digital certificate received from a CA. In response, as described in FIG. 8, the receiver can validate the digital signature to confirm the identity of a user and then validate the digital signature, confirming the identity and message.

Figure 8:
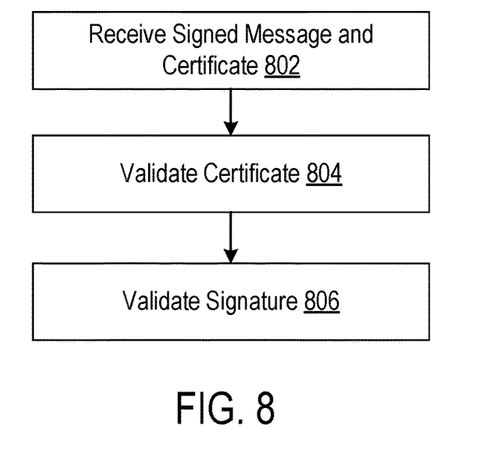
FIG. 8 is a flow diagram illustrating a method for signing a message according to some embodiments of the disclosure.

FIG. 8 is a flow diagram illustrating a method for signing a message according to some embodiments of the disclosure.

In block 802, the method receives a signed message and a digital certificate. In the illustrated embodiment, message may be received at a third-party from a host device. In the illustrated embodiment, the signed message corresponds to the message generated in FIG. 7 and the digital certificate corresponds to the digital certificate generated in FIG. 6. As an example, the message may comprise a login request and the receiver may comprise a server application.

In block 804, the method validates the certificate. In the illustrated embodiment, the certificate includes a CA identifier and a signature of CA generated during the generation of the certificate. Thus, the method may obtain the public key of the CA (via a key exchange) and validate the CA's signature included in the digital certificate. After confirming that the certificate is valid, the method may then use the public key in the certificate to verify the digital signature.

In block 806, the method validates the digital signature using the public key included in the digital certificate. In this embodiment, after verifying the signature the method extracts the public key and confirms the digital signature included with the message, thus confirming that the message is valid.

In the illustrated embodiments, the private key used to sign message is local to a memory device and is never persistently stored. This reduces the likelihood of key leakage as compared to existing systems (e.g., cryptographic co-processors, etc.). Further, key exchanges during manufacturing and customer use enable a CA or KMS to verify the ownership of keys thus ensuring that the private key is always uniquely associated with a memory device and user. Thus, with these safeguards in place, traditional public-key infrastructure can be used to guarantee the identity of the user of a memory device in many or all operations.

Figure 9:
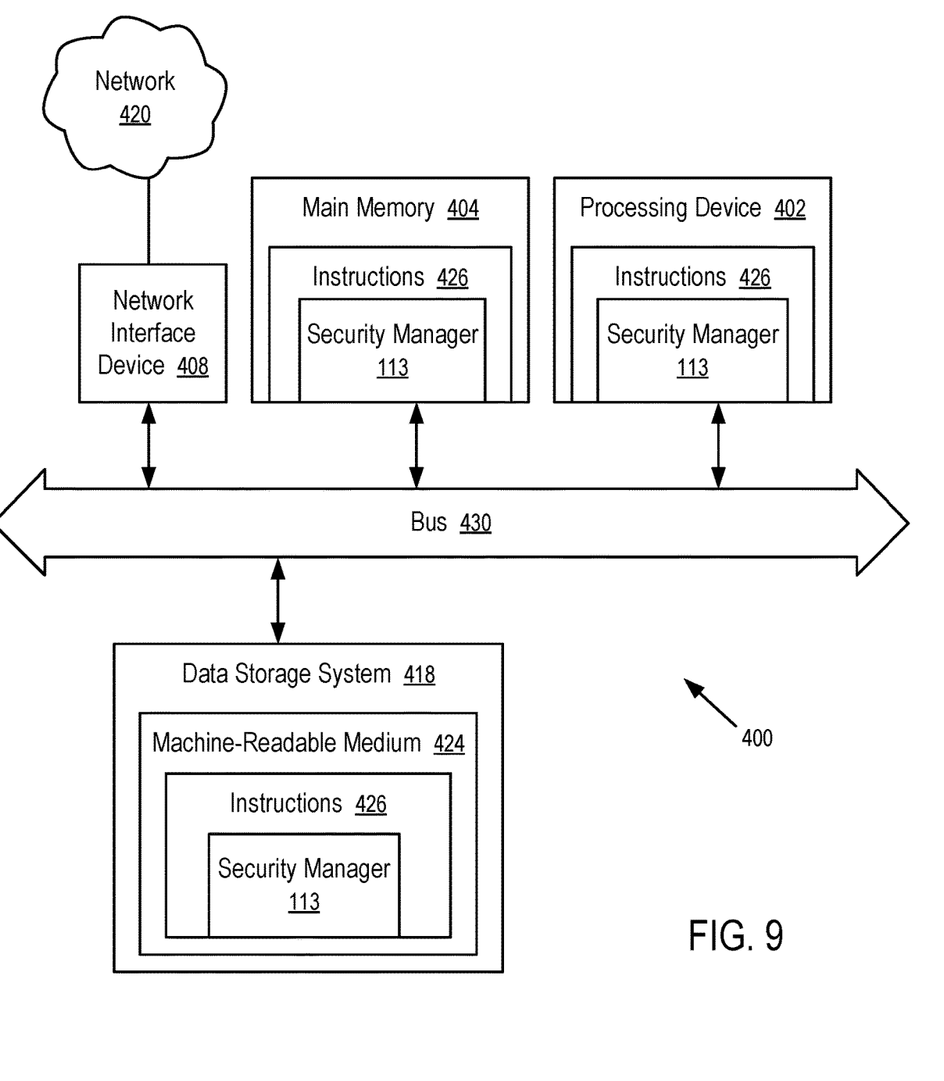
FIG. 9 is a block diagram of an example computer system in which embodiments of the present disclosure can operate.

FIG. 9 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a security manager 113 (e.g., to execute instructions to perform operations corresponding to the security manager 113 described with reference to FIGS. 1-8). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a security manager 113 (e.g., the security manager 113 described with reference to the preceding Figures). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   generating, by a memory device, an asymmetric key pair from a physically unclonable function (PUF), the asymmetric key pair including a public key and a private key, wherein generating an asymmetric key pair comprises generating a digital fingerprint using a PUF circuit;
   generating, by the memory device, a certificate signing request (CSR) for the public key, the CSR including a user identifier and a customer public key;
   requesting, by the memory device, a digital certificate of the public key from a certificate authority (CA), the certificate authority storing a mapping between the customer public key and the user identifier;
   receiving, by the memory device, a message from a host device, the message generated by an application executed by the host device;
   validating, by the memory device, the message using a second public key associated with the host device,
   signing, by the memory device, the message using the private key; and
   transmitting, by the host device, the signed message and the digital certificate to a remote computing device, the remote computing device validating the message using a public key included in the digital certificate.

2. The method of claim 1, wherein generating an asymmetric key pair further comprises generating an x coordinate of an elliptic curve using the digital fingerprint.

3. The method of claim 2, wherein signing the message using the private key comprises using the elliptic curve to sign the message using an Elliptic Curve Digital Signature Algorithm.

4. The method of claim 1, wherein generating the CSR is performed in response to a signed command issued by the host device, the command signed using a customer private key corresponding to the customer public key.

5. The method of claim 1, wherein the CA comprises a key management system.

6. The method of claim 1, wherein the digital certificate comprises an X.509 certificate.

7. A memory device comprising:

a controller; and a storage medium for tangibly storing thereon program instructions causing the controller to perform the operations of:

generating an asymmetric key pair from a physically unclonable function (PUF), the asymmetric key pair including a public key and a private key, wherein generating an asymmetric key pair comprises generating a digital fingerprint using a PUF circuit, generating a certificate signing request (CSR) for the public key, the CSR including a user identifier and a customer public key, requesting a digital certificate of the public key from a certificate authority (CA), the certificate authority storing a mapping between the customer public key and the user identifier, receiving a message from a host device, the message generated by an application executed by the host device, validating the message using a second public key associated with the host device, signing the message using the private key, and transmitting the signed message and the digital certificate to the host device.

8. The memory device of claim 7, wherein generating an asymmetric key pair further comprises generating an x coordinate of an elliptic curve using the digital fingerprint.

9. The memory device of claim 7, wherein signing the message using the private key comprises using the elliptic curve to sign the message using an Elliptic Curve Digital Signature Algorithm.

10. The memory device of claim 7, wherein generating the CSR is performed in response to a signed command issued by the host device, the command signed using a customer private key corresponding to the customer public key.

11. The memory device of claim 7, wherein the CA comprises a key management system.

12. The memory device of claim 7, wherein the digital certificate comprises an X.509 certificate.

13. A non-transitory computer-readable storage medium for tangibly storing computer program instructions capable of being executed by a computer processor, the computer program instructions defining the steps of:

generating an asymmetric key pair from a physically unclonable function (PUF), the asymmetric key pair including a public key and a private key, wherein generating an asymmetric key pair comprises generating a digital fingerprint using a PUF circuit;

generating a certificate signing request (CSR) for the public key, the CSR including a user identifier and a customer public key;

requesting a digital certificate of the public key from a certificate authority (CA), the certificate authority storing a mapping between the customer public key and the user identifier;

receiving a message from a host device, the message generated by an application executed by the host device;

validating the message using a second public key associated with the host device;

signing the message using the private key; and transmitting the signed message and the digital certificate to a remote computing device, the remote computing device validating the message using a public key included in the digital certificate.

14. The non-transitory computer-readable storage medium of claim 13, wherein generating an asymmetric key pair further comprises generating an x coordinate of an elliptic curve using the digital fingerprint.

15. The non-transitory computer-readable storage medium of claim 13, wherein signing the message using the private key comprises using the elliptic curve to sign the message using an Elliptic Curve Digital Signature Algorithm.

16. The non-transitory computer-readable storage medium of claim 13, wherein generating the CSR is performed in response to a signed command issued by the host device, the command signed using a customer private key corresponding to the customer public key.

17. The non-transitory computer-readable storage medium of claim 13, wherein the CA comprises a key management system.

* * * * *